United States Patent
Yenamandra et al.

(10) Patent No.: US 9,285,240 B2
(45) Date of Patent: Mar. 15, 2016

(54) EV ROUTE OPTIMIZATION THROUGH CROWDSOURCING

(71) Applicant: QUALCOMM Incorporated, San Diego, CA (US)

(72) Inventors: Rao Sanyasi Yenamandra, San Diego, CA (US); Naveen Kalla, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/445,920

(22) Filed: Jul. 29, 2014

(65) Prior Publication Data

US 2015/0045985 A1    Feb. 12, 2015

Related U.S. Application Data

(60) Provisional application No. 61/863,253, filed on Aug. 7, 2013.

(51) Int. Cl.
*G01C 21/36* (2006.01)
*G01C 21/34* (2006.01)

(52) U.S. Cl.
CPC ........ *G01C 21/3679* (2013.01); *G01C 21/3469* (2013.01); *G01C 21/3697* (2013.01)

(58) Field of Classification Search
CPC ........... G01C 21/3679; G01C 21/3697; G01C 21/3469
USPC ................................ 701/1; 903/903, 906, 907
See application file for complete search history.

(56) References Cited

U.S. PATENT DOCUMENTS

| 2012/0098676 | A1  | 4/2012  | Oizumi et al. |
| 2012/0179323 | A1* | 7/2012  | Profitt-Brown et al. ..... 701/29.1 |
| 2012/0245750 | A1  | 9/2012  | Paul et al. |
| 2012/0296678 | A1  | 11/2012 | Boot et al. |
| 2013/0090936 | A1  | 4/2013  | Solomon et al. |

FOREIGN PATENT DOCUMENTS

DE    10 2012 222810 A1 *  6/2014  ......... G06K 9/00812

* cited by examiner

*Primary Examiner* — Rodney Butler
*Assistant Examiner* — Brian P Sweeney
(74) *Attorney, Agent, or Firm* — Haynes and Boone, LLP

(57) ABSTRACT

The present disclosure involves determining charging equipment availability through crowdsourcing. Information is gathered from a plurality of electrically powered vehicle in a geographical region. The charging stations in the geographical region are displayed. A request is received, from a user, to determine occupancy of the electrical charging equipment at one or more of the charging stations during a specified future time window. A calculation is performed based on the information gathered from the electrically powered vehicles. The calculation calculates a probability of the electrical charging equipment at the one or more charging stations being unoccupied during the specified future time window. As a part of the calculation, a weighted probability is assigned to each charging station of being visited by at least one of the electrically powered vehicles. The probability is communicated to the driver.

20 Claims, 4 Drawing Sheets

EV ROUTE OPTIMIZATION THROUGH CROWDSOURCING

PRIORITY DATA

This application is a utility patent application of Provisional Patent Application No. 61/863,253, filed on Aug. 7, 2013, entitled "EV Route Optimization Through Crowdsourcing", the disclosure of which is hereby incorporated by reference in its entirety.

TECHNICAL FIELD

This application relates to optimizing a drive route for electrically powered vehicles.

BACKGROUND

Electrically powered vehicles such as electric vehicles (EVs) and plug-in hybrid electric vehicles (PHEVs) have been steadily gaining popularity. Currently, the electrically powered vehicles have somewhat limited driving ranges, for example varying from several tens of miles to a few hundred miles on a single full charge. As such, the drivers of electrically powered vehicles need to know that they can charge the battery of their vehicle while being out on the road. Many charging stations for the electrically powered vehicles have been deployed along highways or local roads recently, thereby alleviating some of the concerns of drivers of these vehicles.

However, the charging of these electrically powered vehicles may also take a very long time based on their level classification (e.g. 1, 2 etc. based on their charging capacity). Depending on the type of charging equipment offered at the charging station, the charging could take anywhere from 15 minutes (quick charger) to several hours. If a driver of an electrically powered vehicle selects a random charging station on the driving route to charge his/her vehicle, all the charging equipment positioned at that station may already be in use. Therefore, that driver would have to suffer from the delay caused by waiting for other people to charge their vehicles. This delay may be frustrating to the driver. Existing navigation guides or route optimization tools using smart phone apps lack the capability to predict whether a particular charging station will have unoccupied charging equipment by the time the driver reaches that charging station.

Accordingly, although existing methods and devices for navigating and optimizing routes for electrically powered vehicles are generally adequate for their intended purposes, they have not been entirely satisfactory in every aspect. There is a need in the art for improved navigation guides and route optimization tools for electrically powered vehicles.

SUMMARY

The present disclosure provides a method of determining charging equipment availability through crowdsourcing. Information is gathered from a plurality of electrically powered vehicles such as electric vehicles (EVs) or plug-in hybrid electric vehicles (PHEVs) in a geographical region. A plurality of charging stations in the geographical region is displayed. The charging stations each provide electrical charging equipment configured to charge the electrically powered vehicles. A request is received from a user to obtain an occupancy status of the electrical charging equipment at one or more of the charging stations during a specified future time window. Based on the information gathered from the plurality of electrically powered vehicles, a likelihood is calculated regarding of the electrical charging equipment at the one or more charging stations being unoccupied during the specified future time window. The calculating comprises assigning a weighted probability to each charging station of being visited by at least one of the electrically powered vehicles. The likelihood is communicated to the user.

The present disclosure also provides a system for determining charging equipment availability through crowdsourcing. The system includes a computer memory storage device configured to store executable computer programming instructions. The system also includes a computer processor operatively coupled to the computer memory storage device. The computer processor is configured to execute the computer programming instructions to perform the following steps: gathering information from a plurality of electrically powered vehicles such as electric vehicles (EVs) or plug-in hybrid electric vehicles (PHEVs) in a geographical region; displaying a plurality of charging stations in the geographical region, wherein the charging stations each provide electrical charging equipment configured to charge the electrically powered vehicles; receiving, from a user, a request to obtain an occupancy status of the electrical charging equipment at one or more of the charging stations during a specified future time window; calculating, based on the information gathered from the plurality of electrically powered vehicles, a likelihood of the electrical charging equipment at the one or more charging stations being unoccupied during the specified future time window, wherein the calculating comprises assigning a weighted probability to each charging station of being visited by at least one of the electrically powered vehicles; and communicating the likelihood to the user.

The present disclosure further provides a non-transitory computer readable medium comprising executable instructions that when executed by a processor, causes the processor to perform the steps of: gathering information from a plurality of electrically powered vehicles such as electric vehicles (EVs) or plug-in hybrid electric vehicles (PHEVs) in a geographical region; displaying a plurality of charging stations in the geographical region, wherein the charging stations each provide electrical charging equipment configured to charge the electrically powered vehicles; receiving, from a user, a request to obtain an occupancy status of the electrical charging equipment at one or more of the charging stations during a specified future time window; calculating, based on the information gathered from the plurality of electrically powered vehicles, a likelihood of the electrical charging equipment at the one or more charging stations being unoccupied during the specified future time window, wherein the calculating comprises assigning a weighted probability to each charging station of being visited by at least one of the electrically powered vehicles; and communicating the likelihood to the user.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

Figure 1:
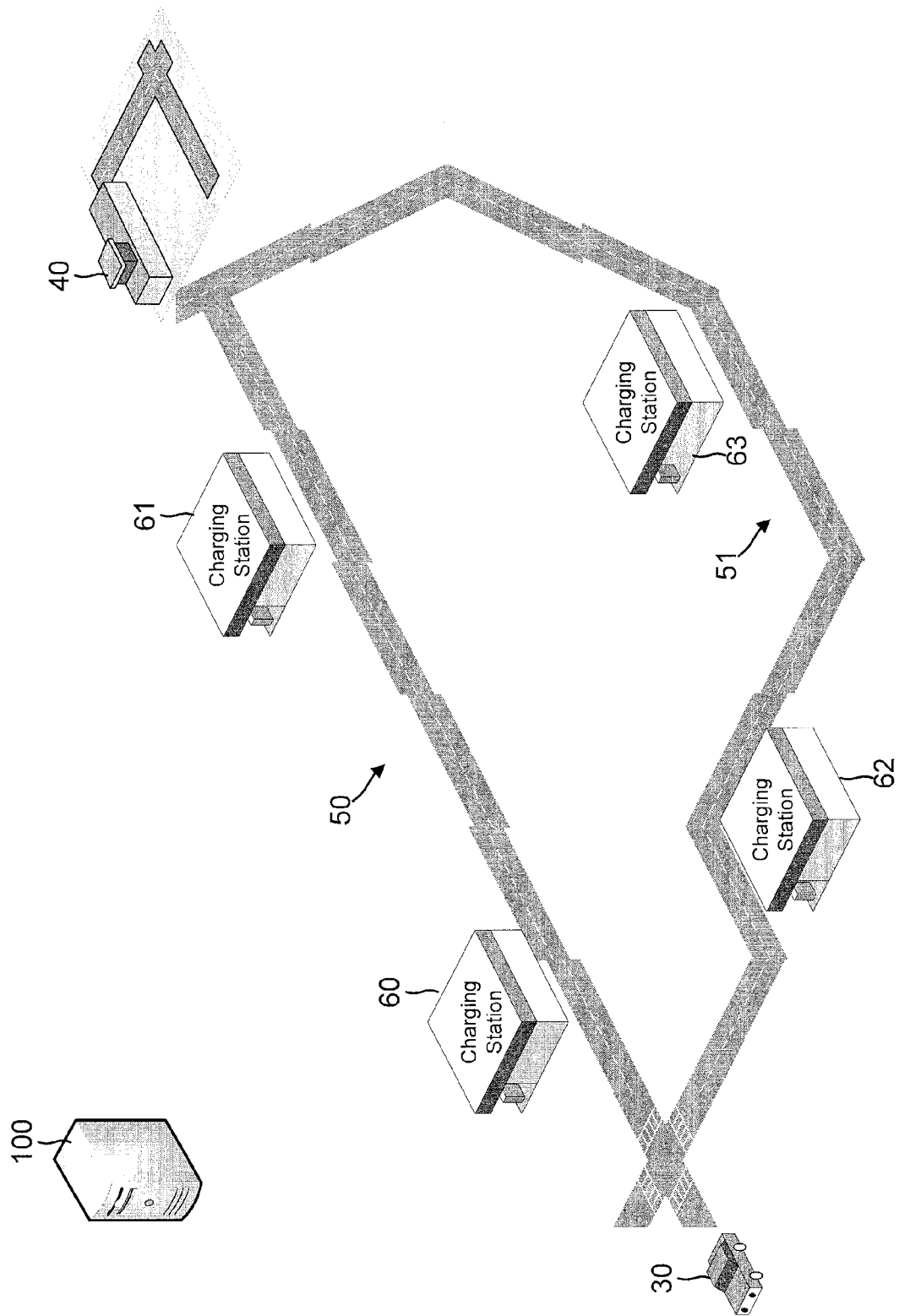
FIG. 1 is a simplified block diagram illustrating a simplified example environment in which a route optimization process takes place according to an embodiment of the present disclosure.

FIG. 1 illustrates an example context in which the route optimization process of the present disclosure takes place. An electrically powered vehicle electrically powered vehicle 30 is on the road. The electrically powered vehicle may include an electric vehicle (EV), or a plugin hybrid electrical vehicle (PHEV), or any other vehicle that is at least partially powered by electricity (e.g., an electric motor) for driving purposes. The driver of the electrically powered vehicle wishes to reach a destination 40, for example an airport. The driver of the electrically powered vehicle 30 may be trying to catch a flight at the airport, and thus the trip to the airport is a time-sensitive matter. In the example context shown in FIG. 1, there are two routes available for the driver of the electrically powered vehicle 30 to reach the destination 40: route 50 and route 51. One or more charging stations are deployed along each of the route 50 and 51. For example, charging stations 60-61 are deployed along the route 50, and charging stations 62-63 are deployed along the route 51.

Suppose that, given the present traffic conditions, the amount of time it would take for the electrically powered vehicle 30 to reach the destination 40 via either the route 50 or the route 51 would not be noticeably different. Also suppose that the electrically powered vehicle's battery is down to a sufficiently low level that it requires a charge to reach the destination 40. In this scenario discussed above, the availability of charging equipment at a particular charging station at the time the electrically powered vehicle reaches that charging station is of great concern. Since the trip to the destination is a time-sensitive matter, the driver cannot typically afford to incur a lengthy delay after reaching a charging station only to discover that all charging equipment is occupied by other electrically powered vehicles at that station.

There have been some methods and devices for informing a driver what the current status is at a given charging station. For example, certain smartphone applications may display the availability of charging posts and/or parking slots at one or more specified charging stations on a navigation map. While this information may provide some value to the driver of the electrically powered vehicle 30, this still does not guarantee that the status of the charging equipment will remain the same once the electrically powered vehicle 30 actually reaches that charging station. To illustrate, the smartphone application may inform the driver of the electrically powered vehicle 30 that the charging station 61 currently has 5 available parking spots and 3 charging posts available, where each charging post is capable of charging the electrically powered vehicle 30. The driver of the electrically powered vehicle 30 therefore relies on this information and plans on making a quick stop at the charging station 61 on his way to the destination 40.

However, by the time the electrically powered vehicle 30 reaches the charging station 61, which may be 30 minutes later, the driver of the electrically powered vehicle 30 may be disappointed to find out that all the parking spots are now gone, and all the charging posts are currently being used by other electrically powered vehicles. The typical charging time for an electrically powered vehicle may take anywhere from 15 minutes to several hours. Thus, the driver of the electrically powered vehicle 30 may be forced to wait an unknown amount of time before one of the charging posts opens up, at which time his electrically powered vehicle 30 can be charged. This unknown amount of time delay may be quite detrimental to the driver, for example it may cause the driver to miss his flight at the airport.

As shown by the example scenario discussed above, the inability to determine the occupancy at a charging station at a specified future point in time can be a significant shortcoming of existing navigation guides or route optimization tools for electrically powered vehicles charging en route. According to the various aspects of the present disclosure, an improved navigation guide or route optimization tool predicts the probability of occupancy of a selected charging station at a specified future time window, for example an estimated time window during which the electrically powered vehicle should arrive at the selected charging station. The various aspects of the present disclosure may be discussed in detail below using the scenario illustrated in FIG. 1 as an example.

In one embodiment, the driver of the electrically powered vehicle 30 tentatively selects one of the routes 50-51 route to his destination 40. This may be done using any one of the many available smart phone applications. The route selection may be done in a manner so that as many charging stations are available as possible to reduce the driver's range anxiety, even if the driver may be certain that his electrically powered vehicle 30's state of battery charge would allow him to get to the destination 40 in most situations. Once the driver selects the route, he may load the route to his electrically powered vehicle 30's GPS system. In some electrically powered vehicles, a driver could also select an optimized route on the electrically powered vehicle's GPS directly, without relying on a smartphone.

The electrically powered vehicle 30, once started, sends the route information as well as the start timestamp, GPS location, state of the battery charge (SoC), electrically powered vehicle's battery threshold (Depth of Discharge) to a central server 100. The EV may periodically update this data to a server on its network specially to indicate any decisions to change the selected route or terminate the route.

The server 100 gathers the types of data discussed above not just from the electrically powered vehicle 30, but from a plurality of other electrically powered vehicles (not illustrated) in a given geographical region, for example the geographical region covering the routes 50-51. The gathering of other electrically powered vehicle's data is an aspect of crowdsourcing. The crowdsourced data allows the server 100 to determine the likely use (probability of occupancy) of the charging equipment at each of the charging stations 60-63.

As an example, a simple algorithm executed by the server 100 to determine the probability of occupancy of the charging stations 60-63 is discussed below. Based on the number of electrically powered vehicles in the relevant geographical region, a given electrically powered vehicle's current SoC and its battery threshold (Depth of Discharge), and assuming an average driving speed for the electrically powered vehicle, the probability of that electrically powered vehicle's likely use of the 1st available charging station (the first charging station on that electrically powered vehicle's route) is calculated. For reasons of simplicity, the charging station may be abbreviated as EVSE (electrical vehicle supply equipment), and electrically powered vehicle may be abbreviated as EV hereinafter.

Probability $P_i$ is higher as that EV approaches a EVSEi, if its SoC and battery threshold are such that it will run out of charge before it reaches the $(i+1)^{th}$ EVSE. Also it is reasonable to assume that $P_1+P_2+\ldots P_n <=1$. (less than 1 to consider a case where the EV decides not to charge). Based on the above, it may be stated that $P_n = \frac{1}{2}$, $P_{n-1} = \frac{1}{4}, \ldots P_1 = \frac{1}{2^n}$, where n is the number of EVSE's on the route before the electrically powered vehicle runs out of charge. This step is repeated for the next EVSE and so on, till the last EV.

Suppose that data is obtained from electrically powered vehicles: $EV_1$ to $EV_j$. Based on the speed of the EV, for a particular future time t, the probabilities can be added up, and the total may be divided by the number of charging posts available at the EVSE location. That value may then be used to determine the probability of getting a charging post.

The following example is used to illustrate the above computation. Suppose there are 2 EVSEs enroute of $EV_1$ based on the remaining range. And the average time taken to reach $EVSE_1$ is 1 hour from time t, and the time taken to reach the $EVSE_2$ is 2 hours from time t. Also suppose that another $EV_2$ is moving in the same route and has charge left only to reach $EVSE_1$. Based on the above algorithm, the probability of the $EV_1$ reaching $EVSE_1$ is ¼ in the time window (t+1) hours, and $EVSE_2$ is ½ in the time window (t+2) hours. The probability of the $EV_2$ using $EVSE_1$ is ½ in the time window (t+1) hour. Now suppose that $EVSE_1$ location has 1 charging post, and $EVSE_2$ location has 2 charging posts, where each charging post can be used to charge an EV. In that case, the probability of all charging posts at EVSE1 location being in use at time (t+1) is: (P at $EVSE1_{EV1}$+P at $EVSE1_{EV2}$)/number of charge posts at $_{EVSE1}=(¼+½)/1=0.75$. Probability of charge posts being in use at time (t+2) is: (P at $EVSE2_{EV1}$+P at $EVSE2_{EV2}$)/number of charge posts at $_{EVSE2}=(½+0)/2=0.25$. This information can be used by a third EV to plan its route.

It is understood that the algorithm discussed above merely provides a simple example of calculating probability of occupancy at one or more charging stations at an estimated arrival time. Nevertheless, the above algorithm is more accurate than conventional methods of estimating a state of congestion at charging stations. For example, some conventional methods of estimating a state of congestion at charging stations simply assign each available charging station along a route the same probability of being visited or used by an electrically powered vehicle. This conventional model is unrealistic and grossly oversimplifies real world situations because an electrically powered vehicle is not likely to visit each available charging station along a route with equal probability. Instead, an electrically powered vehicle is less likely to visit the first available charging station along a route, because at that time, the electrically powered vehicle typically has enough charge left to at least get to the next charging station along the route, if not the subsequent charging stations after that. As the electrically powered vehicle moves along the route, the charge of the electrically powered vehicle is being steadily depleted, resulting in a lower state of charge. This means that the electrically powered vehicle is more and more likely to stop at the next available charging station as the electrically powered vehicle moves along the route. In other words, the charging stations near the end of the route (but still within the driving range of the electrically powered vehicle based on its current state of charge) typically have substantially higher likelihoods of being visited by the electrically powered vehicle than the charging stations at the beginning of the route.

In order to better approximate this real world scenario, the example algorithm of the present disclosure discussed above utilizes an exponential model (e.g., $1/(2^n)$) to assign the various (and non-equal) possibilities to each charging station of being visited by a particular EV. As such, each charging station that is farther away from a present location of the EV is assigned a higher probability of being visited by the EV for charging, as long as these charging stations are still all within the projected driving range of the EV based on the electrically powered vehicle's state of charge. Stated differently, the charging stations farther down the route of the EV are weighted more in terms of their probability of being visited by the EV.

In some alternative embodiments, other types of weighted probability models may be used to approximate the likelihood of the charging stations along a route of being visited by an EV. For example, suppose there are 5 charging stations (EVSE1, EVSE2, EVSE3, EVSE4, and EVSE5) along a route of an EV, and the EV can reach all 5 of these charging stations before running out of charge. Also assuming for the sake of discussion that there is a 100% probability that the EV will visit at least one of these EVSEs. In some embodiments, EVSE1 may be assigned a 10% probability of being visited by the EV, EVSE2 may be assigned a 15% probability of being visited by the EV, EVSE3 may be assigned a 20% probability of being visited by the EV, EVSE4 may be assigned a 25% probability of being visited by the EV, and EVSE5 may be assigned a 30% probability of being visited by the EV. In this model, the probability of any particular charging station being visited by the EV is still weighted (i.e., greater probability for latter charging stations than earlier charging stations), but the weighting is not done exponentially or logarithmically. Instead, the probability percentage may increase steadily (e.g., 5% for each subsequent charging station).

It is understood, however, that the above model may also be readily adjusted to better approximate real world scenarios. For example, the total sum of probabilities may be less than 100%, which may account for some electrically powered vehicles going home before the route is over, or the EV taking a detour, or the driver of the EV not paying attention to the electrically powered vehicle's state of charge and as a result inadvertently missing any available opportunity to stop at any of the charging stations. As such, the total sum of probabilities of the EV visiting at least one of the charging stations EVSE1-EVSE5 may be less than 100%, for example anywhere from 50% to 95%.

As another example, the percentage increase in the probability of being visited by the EV from earlier charging station to latter charging station need not be 5%, but may be any other suitable number instead, for example from 1% to 10%.

As yet another example, the percentage increase in the probability of being visited by the EV from charging station to charging station is not necessarily a fixed percentage (5% in the above example), but this percentage itself my increase or decrease. Using the same example above to illustrate, the EVSE1 may be assigned a 1% probability of being visited by the EV, EVSE2 may be assigned a 4% probability of being visited by the EV, EVSE3 may be assigned a 10% probability of being visited by the EV, EVSE4 may be assigned a 35% probability of being visited by the EV, and EVSE5 may be assigned a 50% probability of being visited by the EV.

Other more complex algorithms with more input metrics reported by the electrically powered vehicles may also be used in various embodiments. For example, the server 100 may compile a history of each electrically powered vehicle's driver/user behavioral pattern to improve the accuracy of the algorithm. For example, over a period of time, the server 100 may discover that a particular driver A prefers to recharge his EV when the battery is down to about 40%, whereas another driver B may prefer to recharge his EV when the battery is down to about 5%. These apparent preferences by the EV drivers A and B may be used to provide a more accurate estimate of the likelihood that they will charge at a particular charging station on a route.

As another example, over a period of time, the server 100 may also discover that a particular driver C prefers to always charge his EV battery to its fullest extent once he stops at a charging station to recharge, whereas another driver D may prefer to recharge mostly at home, and only charges his EV battery to an amount sufficient for the EV to get home if the driver D is ever at a charging station. These apparent preferences by the EV drivers C and D may be used to provide a more accurate estimate of how long each of the drivers C and D will remain at a particular charging station (if the data shows that they are there already).

Therefore, the present disclosure may monitor the behavior of the respective user for each EV that is of interest. The user behavioral patterns may be compiled over time and analyzed to predict what a given EV is likely to do with greater precision. As such, the mathematical models discussed above (e.g., the model for assigning probabilities to charging stations regarding being visited by electrically powered vehicles) may be adjusted to account for these user preferences or patterns.

As an example, a model may assign default probability values of $P_n=\frac{1}{2}, P_{n-1}=\frac{1}{4}, \ldots P_1=\frac{1}{2^n}$ for an EV stopping at any one of the n number of charging stations on the route. These default values may be assigned for an EV whose user's behavioral pattern or preferences are not well known yet. In other words, there is little data on this user of the EV. Once a sufficient amount of user preference data has been collected and analyzed, the model discussed above may be adjusted. For example, if the server 100 learns that the user of the EV prefers to charge his EV only when the EV is almost out of charge, the model discussed above may be adjusted to be weighted even more heavily in favor of latter charging stations. On the other hand, if the server 100 learns that the user of the EV prefers to charge his EV when its state of charge reaches a particular level, for example about 50%, then the model discussed above may be adjusted to:

1. Identify the charging station that is the closest to the EV when the EV reaches about a 50% of state of charge. This may be done by calculating the electrically powered vehicle's current speed and the respective distances of the charging stations to the EV; and
2. Assign to the identified charging station a significantly greater probability (e.g., significantly greater than the rest of the relevant charging stations along the route) of being visited by the EV. For example, whereas the identified charging station (closest to the electrically powered vehicle's projected location when the electrically powered vehicle's battery depletes to about 50%) may have initially been assigned a 15% likelihood of being visited by the EV in the original model (with default values), it may now be assigned a 80% (or a little higher or lower) probability of being visited by the EV.

As another example, suppose that the server 100 has learned that an EV (referred to as EV1 herein) typically only stays at a charging station for a few minutes whenever the EV1 stops at a charging station. This could be due to the EV1 having advanced charging equipment that allows the EV1 to be charged very quickly, or the driver of the EV1 prefers to charge the EV1 just to a minimum amount of level that allows the EV1 to get home, where the EV1 will be fully charged.

Regardless of the reason, since the server 100 has learned that the EV1 almost never remains at a charging station for a long period of time, then in performing calculations (regarding likelihood of available charging equipment at a charging station) for a different EV2, the server 100 may discount or even remove EV1 from the calculations entirely. This is because EV1 may or may not be at a target charging station when EV2 arrives there, since EV1 is only at the target charging station for a brief time window (and as a result could easily miss EV2). Also, due to traffic conditions that cannot be predicted with 100% accuracy, it is even more complicated to try to predict whether EV1 and EV2 will overlap (and if so, how long will the overlap be) their visits at a particular charging station, which means it may just be more convenient to remove EV1 from the calculations altogether. Furthermore, even in the worst case scenario where EV1 actually is at the target charging station (and occupies the charging equipment) when EV2 arrives, EV2 does not need to wait very long (e.g., a few minutes or so) before EV1 departs anyway. This should not affect EV2's plans too much.

Based on the above discussions, it can be seen that by gathering and analyzing charging patterns of the electrically powered vehicles over time, the server 100 may make more intelligent calculations when calculating probabilities for charging equipment availability.

It is understood that the present disclosure also takes into account of the number of charging posts provided by each charging station. Thus, a charging station with a greater number of charging posts can accommodate more electrically powered vehicles, and as such it has a higher probability of having charging equipment availability than a charging station with a fewer number of charging posts. The algorithm discussed above may be adjusted to reflect the number of charging posts at each charging station of interest. Furthermore, the algorithm of the present disclosure may also take into account of live traffic conditions, for example in order to estimate the time at which each EV of interest will likely arrive at any given charging station.

It is also understood that although a single server 100 is mentioned as an example entity to gather the crowdsourced data and to perform the probability calculations, these tasks may be done by a plurality of entities, for example different servers, which may be located in the same or different geographical areas. These servers may share data with each to facilitate the crowdsourcing accuracy.

Figure 2:
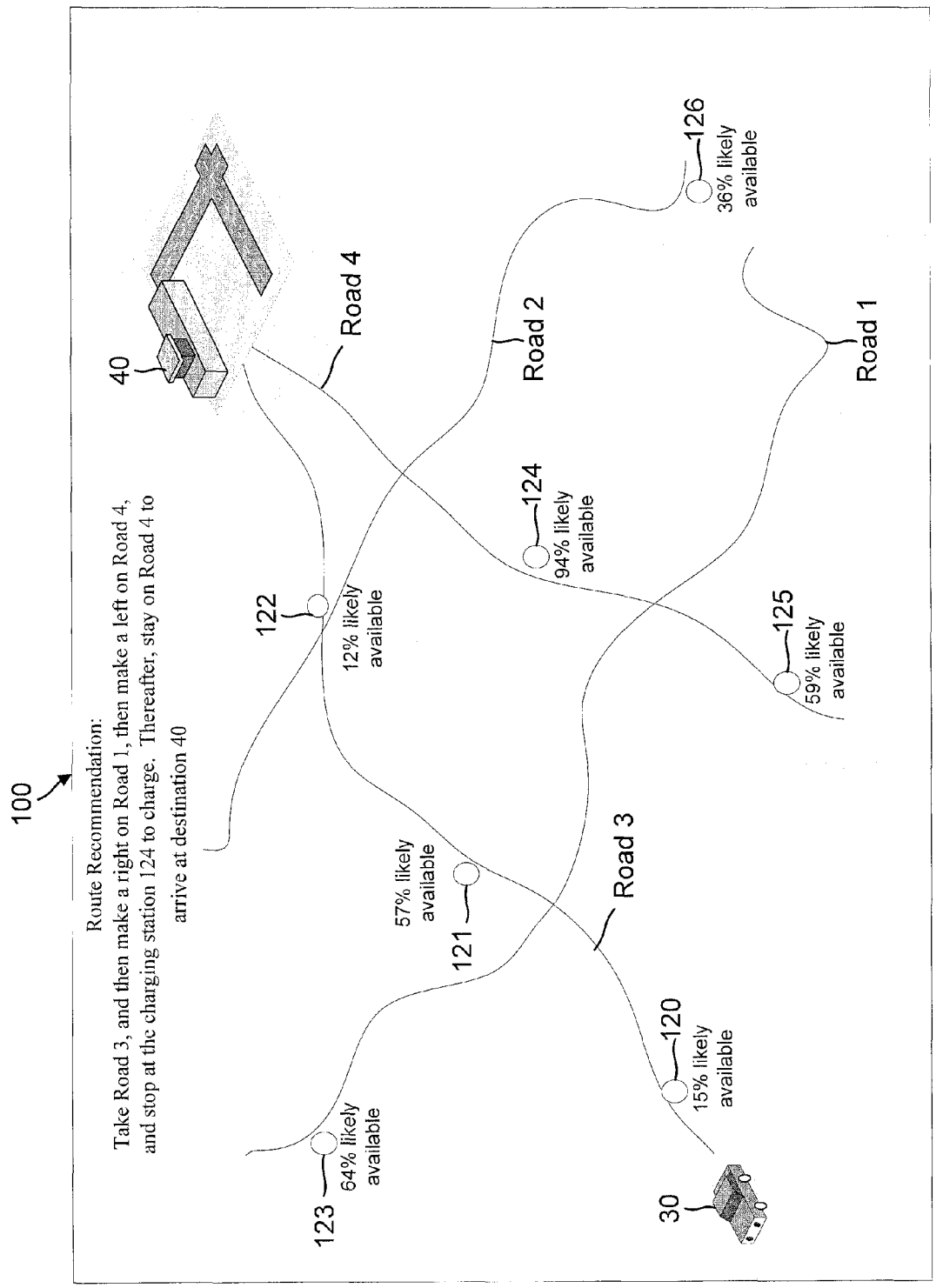
FIG. 2 is a simplified example user interface for visually displaying the likelihood of one or more charging stations having available charging equipment within a geographical area.

FIG. 2 is a simplified user interface 110 of a system for communicating, to a user of an EV, the likelihood of one or more charging stations having available charging equipment within a geographical area. The system may include one or more servers, such as the server 100 in FIG. 1, for gathering and analyzing crowdsourced data regarding electrically powered vehicles within a particular geographical area as well as their respective user's behavioral patterns. The system may also include a software module (e.g., a downloadable app) that is installed in a mobile computing device. The software module may be developed by the entity that runs the server 100, or may be developed by a third party developer. The mobile computing device may be an electronic display integrated in the EV itself (e.g., GPS navigation system), or a smartphone (e.g., Apple's iPhone or Android-based smartphone), or a table computer, or a laptop/desktop computer. The user interface 110 may be visually displayed via a screen of the mobile computing device, which may include a touchscreen in some embodiments.

In the example shown in FIG. 2, the user interface 110 visually displays virtual representations of several roads "Road 1", "Road 2", "Road 3", and "Road 4", as well as the virtual representations of a plurality of charging stations 120-126 dispersed along these roads. The user interface 110 also displays a virtual representation of the electrically powered vehicle 30 (the EV of interest, i.e., needs charging) and a virtual representation of the destination 40 (e.g., airport) of the electrically powered vehicle 30. In response to a request from the user, who may be a driver of the electrically powered vehicle 30, the user interface 110 may display the estimated probability of having charging equipment available at each of the charging stations 120-126.

In some embodiments, the estimated probability may be displayed as a numerical value next to the virtual representation of each of the charging stations 120-126. For example, the estimated probability of the charging station 120 having available charging equipment by the time the electrically powered vehicle 30 arrives as the charging station 120 is about 15%, the estimated probability of the charging station 121 having available charging equipment by the time the electrically powered vehicle 30 arrives as the charging station 121 is about 57%, the estimated probability of the charging station 122 having available charging equipment by the time the electrically powered vehicle 30 arrives as the charging station 122 is about 12%, etc.

As discussed above, these estimated probabilities are calculated based on crowdsourced data of a plurality of other electrically powered vehicles in a geographical area of interest. The geographical area of interest may include the area covered by Road 1 through Road 4 and displayed in the user interface 110, as well as some areas surrounding the area shown in the user interface 110 (since electrically powered vehicles not currently in the area shown in the user interface 110 may still arrive within this area subsequently). Again, the system of the present disclosure may employ an algorithm that more closely approximates real world conditions by assigning non-equal probability of each charging station being visited by electrically powered vehicles. The algorithm may also adjust the algorithm to take into account of the behavioral patterns of the users of each EV in order to improve the accuracy of the predicted results.

In addition, the user interface 110 is configured to update the estimated probabilities in real time in some embodiments. Stated differently, the system herein monitors factors such as live traffic conditions, the driving speed of the electrically powered vehicle 30 as well as other electrically powered vehicles, the routes changes of the various electrically powered vehicles, etc., and performs calculations periodically (e.g., every few seconds, or tens of seconds, or minutes). The estimated probabilities shown in the user interface 110 are refreshed or updated as soon as the new calculated probabilities become available. In this manner, the user of the electrically powered vehicle 30 may get the information of interest as quickly as possible.

According to certain aspects of the present disclosure, the user interface 110 can also provide route recommendations to the user of the electrically powered vehicle 30 based on the estimated probabilities of available charging equipment at the charging stations 120-126. For example, suppose the user of the electrically powered vehicle 30 initially plans on taking Road 3 to the destination 40. However, the estimated probabilities of the charging stations 120-122 (i.e., the charging stations along Road 3) having charging equipment available are poor—15% for charging station 120, 57% for charging station 121, and 12% for charging station 122. Therefore, Road 3 is probably not the best route to take if the electrically powered vehicle 30 needs a charge to arrive at the destination 40.

However, based on the estimated probabilities, charging station 124 is highly likely to be available by the time the electrically powered vehicle 30 arrives there. Therefore, the user interface 110 may display the following route recommendation for the user: "Take Road 3, and then make a right on Road 1, then make a left on Road 4, and stop at the charging station 124 to charge. Thereafter, stay on Road 4 to arrive at destination 40." In this manner, the user of the electrically powered vehicle 30 knows that he/she is most likely able to get the electrically powered vehicle 30 charged without having to wait a long time for a charging post to open up at a charging station. This helps the user plan his/her trip with more confidence. It is also understood that in some embodiments, the estimated probabilities and the route recommendations may be communicated audibly, for example via speakers of the EV or of the mobile electronic device, instead of (or in addition to) being displayed visually via the interface 110.

Figure 3:
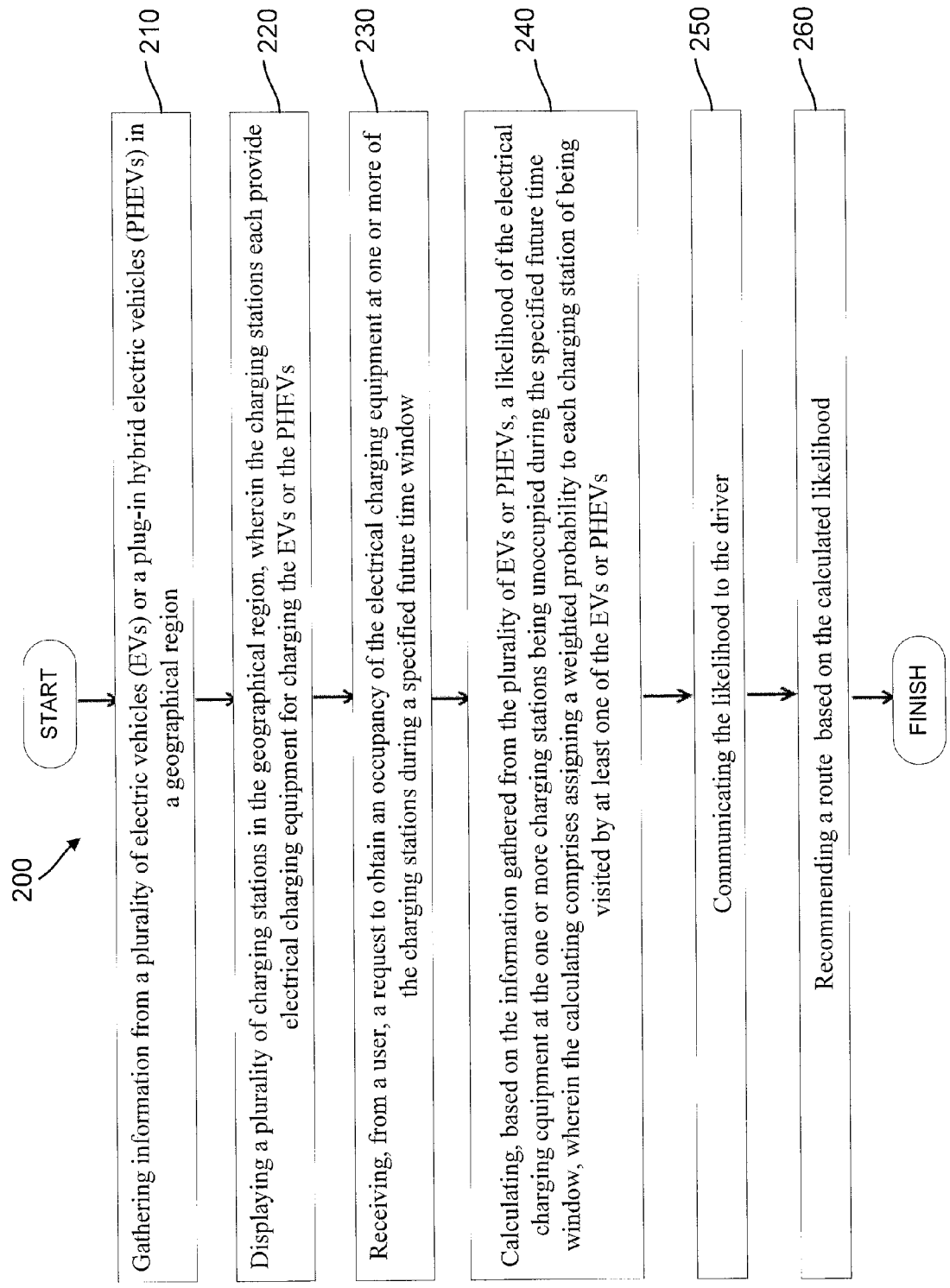
FIG. 3 is a simplified flowchart of a method for determining charging equipment availability through crowdsourcing according to various aspects of the present disclosure.

FIG. 3 is a flowchart illustrating an example method 200 of determining charging equipment availability through crowdsourcing according to various aspects of the present disclosure.

The method 200 includes a step 210 of gathering information from a plurality of electrically powered vehicles such as electric vehicles (EVs) or plug-in hybrid electric vehicles (PHEVs) in a geographical region. In some embodiments, the gathering of the information comprises gathering one or more of the following types of information from each of the electrically powered vehicles: a start timestamp, a GPS location, a state of a battery charge, and a battery threshold, and a current driving speed. In some embodiments, the gathering of the information comprises gathering behavioral pattern of drivers of the electrically powered vehicles. In some embodiments, the displaying comprises displaying virtual representations of the plurality of charging stations via an interface of a mobile electronic device.

The method 200 also includes a step 220 of displaying a plurality of charging stations in the geographical region. The charging stations each provide electrical charging equipment for charging the electrically powered vehicles.

The method 200 also includes a step 230 of receiving, from a user, a request to determine an occupancy status of the electrical charging equipment at one or more of the charging stations during a specified future time window. In some embodiments, the user is a driver of one of the electrically powered vehicles.

The method 200 also includes a step 240 of calculating, based on the information gathered from the electrically powered vehicles, a likelihood of the electrical charging equipment at the one or more charging stations being unoccupied during the specified future time window. The calculation is performed at least in part by assigning a weighted probability to each charging station of being visited by at least one of the electrically powered vehicles. In some embodiments, the calculating is performed such that the weighted probability is a function of the behavioral pattern of the drivers (gathered from the step 210).

The method 200 also includes a step 250 of communicating the likelihood to the driver. In some embodiments, the communicating comprises visually displaying the likelihood as a numerical number on a GPS navigation system of an EV or on a screen of a mobile electronic device. In some embodiments, the communicating comprises audibly announcing the likelihood via speakers of the EV or speakers of the mobile electronic device. In some embodiments, the communicating comprises updating the likelihood in real time.

The method 200 also includes a step 260 of recommending a route to the driver based on the calculating of the probability.

In some embodiments, the step 210 of gathering of the information includes gathering one or more of the following types of information from each of the electrically powered vehicles: a start timestamp, a GPS location, a state of a battery charge, and a battery threshold. In some embodiments, the information is gathered directly from the electrically powered vehicles. In other embodiments, the information is retrieved from one or more servers.

In some embodiments, at least one of the steps 210-260 is performed using one or more electronic processors.

It is understood that additional methods may be performed before, after, or during the steps 210-260 discussed above. In addition, the steps 210-260 need not be performed in the order shown in FIG. 2.

Figure 4:
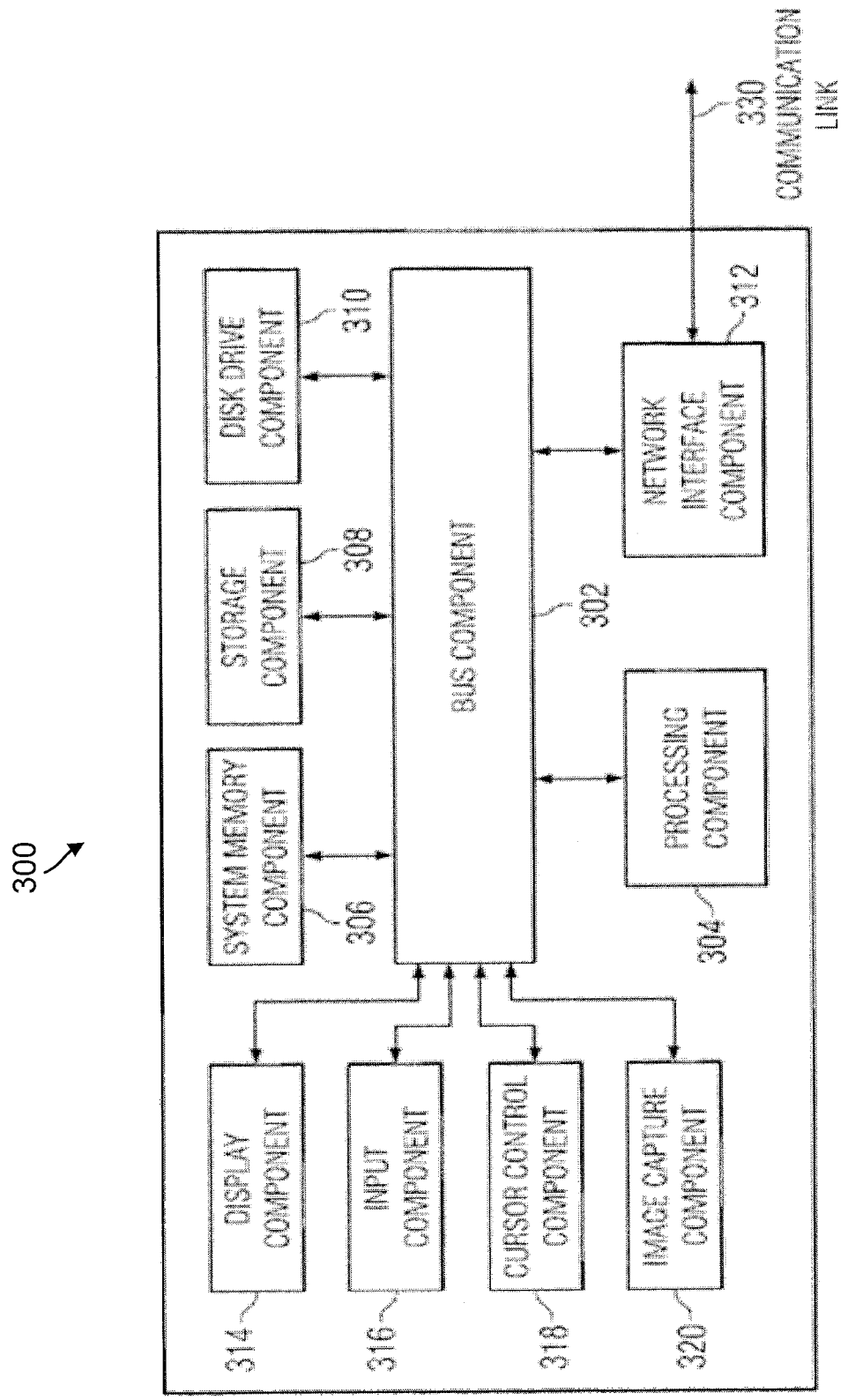
FIG. 4 is a simplified block diagram of a computer system for implementing various methods and devices described according to various aspects of the present disclosure.

FIG. 4 is a block diagram of a computer system 300 suitable for implementing various methods and devices described herein, for example, the various method steps of the method 200 of FIG. 2. In various implementations, the server 100 or the mobile electronic device (on which the user interface 110 is displayed) discussed above may each be at least partially implemented as the computer system 300 for communication with a network in a manner as follows.

In accordance with various embodiments of the present disclosure, the computer system 300, such as a mobile communications device and/or a network server, includes a bus component 302 or other communication mechanisms for communicating information, which interconnects subsystems and components, such as processing component 304 (e.g., processor, micro-controller, digital signal processor (DSP), etc.), system memory component 306 (e.g., RAM), static storage component 308 (e.g., ROM), disk drive component 310 (e.g., magnetic or optical), network interface component 312 (e.g., modem or Ethernet card), display component 314 (e.g., cathode ray tube (CRT) or liquid crystal display (LCD)), input component 316 (e.g., keyboard), cursor control component 318 (e.g., mouse or trackball), and image capture component 320 (e.g., analog or digital camera). In one implementation, disk drive component 310 may comprise a database having one or more disk drive components.

In accordance with embodiments of the present disclosure, computer system 300 performs specific operations by processor 304 executing one or more sequences of one or more instructions contained in system memory component 306. Such instructions may be read into system memory component 306 from another computer readable medium, such as static storage component 308 or disk drive component 310. In other embodiments, hard-wired circuitry may be used in place of (or in combination with) software instructions to implement the present disclosure.

Logic may be encoded in a computer readable medium, which may refer to any medium that participates in providing instructions to processor 304 for execution. Such a medium may take many forms, including but not limited to, non-volatile media and volatile media. In one embodiment, the computer readable medium is non-transitory. In various implementations, non-volatile media includes optical or magnetic disks, such as disk drive component 310 and volatile media includes dynamic memory, such as system memory component 306. In one aspect, data and information related to execution instructions may be transmitted to computer system 300 via a transmission media, such as in the form of acoustic or light waves, including those generated during radio wave and infrared data communications. In various implementations, transmission media may include coaxial cables, copper wire, and fiber optics, including wires that comprise bus 302.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 330 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 300 may transmit and receive messages, data, information and instructions, including one or more programs (i.e., application code) through communication link 330 and communication interface 312. Received program code may be executed by processor 304 as received and/or stored in disk drive component 310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The embodiments of the present disclosure offer many advantages, though it is understood that not all advantages are necessarily discussed herein, and no particular advantage is required for all embodiments. As an example advantage, showing a percentage probability of occupancy of charging posts at a charging station in a specified time window through EV crowdsourcing is immensely useful to EV drivers. This not only reduces their range anxiety, but it also gives them an estimate that a charging station has availability when the driver actually arrives at the charging station during the specified time window. In the example situation shown in FIG. 1, the driver of the electrically powered vehicle 30 will be much less stressed if he knows that the charging station 61 offers a high probability of having charging equipment available by the time the EV arrives at the charging station 61.

The present disclosure also offers advantages in the ability to choose the charging station with the highest probability of availability. For example, the driver of the electrically powered vehicle 30 may choose to stop by the station 60, rather than the charging station 61 as originally intended, if the accurately-crowdsourced data indicates that the charging station 60 has a much higher likelihood of being available than the charging station 61 by the estimated time the electrically powered vehicle 30 arrives at these locations.

Another advantage is that the server 100 may utilize the crowdsourced data to offer alternative route recommendations to the driver of the electrically powered vehicle 30. For example, suppose that after running the algorithm to compute the occupancy probabilities at each of the charging stations 60-63, the server 100 determines that neither the charging station 60 and 61 is likely to have charging equipment available for use by the estimated time the electrically powered vehicle 30 arrives at these charging stations. On the other hand, both the charging station 62 and 63 are likely to have open occupancy (i.e., available) by the estimated time the electrically powered vehicle 30 arrives at these charging stations, that is, if the driver decides to take the route 51. Consequently, even if the driver initially selects the route 50 as its default or intended route to reach the destination 40, the server 100 may recommend the route 51 as an alternate route to the driver of the electrically powered vehicle 30, since the likely availability of the charging stations 62-63 may be an important consideration to the driver. In this manner discussed above, it may be said that the server 100 offers route optimization for electrically powered vehicles. Of course, the driver may either accept the new route recommendation, or decline it. In addition, the alternate route recommendation may be done via an application on a smartphone or tablet computer.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A system for determining charging equipment availability through crowdsourcing, comprising:
   a computer memory storage device configured to store executable computer programming instructions; and
   a computer processor operatively coupled to the computer memory storage module, wherein the computer processor module is configured to execute the computer programming instructions to perform the following steps:
   gathering information from a plurality of electrically powered vehicles in a geographical region, wherein the gathering of the information comprises gathering behavioral pattern of drivers of the electrically powered vehicles;
   displaying a plurality of charging stations in the geographical region, wherein the charging stations each provide electrical charging equipment configured to charge the electrically powered vehicles;
   receiving, from a user, a request to obtain an occupancy status of the electrical charging equipment at one or more of the charging stations during a specified future time window;
   calculating, based on the information gathered from the plurality of electrically powered vehicles, a likelihood of the electrical charging equipment at the one or more charging stations being unoccupied during the specified future time window, wherein the calculating comprises assigning a weighted probability to each charging station of being visited by at least one of the electrically powered vehicles, and wherein the calculating is performed such that the weighted probability is a function of the behavioral pattern of the drivers; and
   communicating the likelihood to the user.

2. The system of claim 1, wherein the user is a driver of one of the electrically powered vehicles, and wherein computer programming instructions, when executed, further perform recommending a route to the driver based on the calculating.

3. The system of claim 1, wherein the gathering of the information comprises gathering one or more of the following types of information from each of the electrically powered vehicles: a start timestamp, a GPS location, a state of a battery charge, and a battery threshold, and a current driving speed.

4. The system of claim 1, wherein the displaying comprises displaying virtual representations of the plurality of charging stations via an interface of a mobile electronic device, and wherein the communicating comprises displaying the likelihood as a percentage number next to the virtual representations of the one or more charging stations.

5. The system of claim 1, wherein the communicating comprises updating the likelihood in real time.

6. The system of claim 1, wherein the assigning of the weighted probability comprises assigning a more weighted probability to one of the charging stations located farther away from the user than one of the charging stations located closer to the user.

7. A method of determining charging equipment availability through crowdsourcing, the method comprising:
   gathering information from a plurality of electrically powered vehicles in a geographical region, wherein the gathering of the information comprises gathering behavioral pattern of drivers of the electrically powered vehicles;
   displaying a plurality of charging stations in the geographical region, wherein the charging stations each provide electrical charging equipment configured to charge the electrically powered vehicles;
   receiving, from a user, a request to obtain an occupancy status of the electrical charging equipment at one or more of the charging stations during a specified future time window;
   calculating, based on the information gathered from the plurality of electrically powered vehicles, a likelihood of the electrical charging equipment at the one or more charging stations being unoccupied during the specified future time window, wherein the calculating comprises assigning a weighted probability to each charging station of being visited by at least one of the electrically powered vehicles, and wherein the calculating is performed such that the weighted probability is a function of the behavioral pattern of the drivers; and
   communicating the likelihood to the user;
   wherein at least one of the gathering, the displaying, the receiving, the calculating, and the communicating is performed using one or more electronic processors.

8. The method of claim 7, wherein the displaying and the communicating are performed at least in part via a mobile computing device of the user or at least in part via an integrated electronic display of an electrically powered vehicle of the user.

9. The method of claim 7, wherein the assigning of the weighted probability comprises assigning a more weighted probability to one of the charging stations located farther away from the user than one of the charging stations located closer to the user.

10. The method of claim 7, wherein the user is a driver of one of the electrically powered vehicles.

11. The method of claim 10, further comprising: recommending a route to the driver based on the calculating.

12. The method of claim 7, wherein the gathering of the information comprises gathering one or more of the following types of information from each of the electrically powered vehicles: a start timestamp, a GPS location, a state of a battery charge, and a battery threshold, and a current driving speed.

13. The method of claim 7, wherein the displaying comprises displaying virtual representations of the plurality of charging stations via an interface of a mobile electronic device, and wherein the communicating comprises displaying the likelihood as a percentage number next to the virtual representations of the one or more charging stations.

14. The method of claim 7, wherein the communicating comprises updating the likelihood in real time.

15. A non-transitory computer readable medium comprising executable instructions that when executed by a processor, causes the processor to perform the steps of:
gathering information from a plurality of electrically powered vehicles in a geographical region, wherein the gathering of the information comprises gathering behavioral pattern of drivers of the electrically powered vehicles;
displaying a plurality of charging stations in the geographical region, wherein the charging stations each provide electrical charging equipment configured to charge the electrically powered vehicles;
receiving, from a user, a request to obtain an occupancy status of the electrical charging equipment at one or more of the charging stations during a specified future time window;
calculating, based on the information gathered from the plurality of electrically powered vehicles, a likelihood of the electrical charging equipment at the one or more charging stations being unoccupied during the specified future time window, wherein the calculating comprises assigning a weighted probability to each charging station of being visited by at least one of the electrically powered vehicles, and wherein the calculating is performed such that the weighted probability is a function of the behavioral pattern of the drivers; and
communicating the likelihood to the user.

16. The non-transitory computer readable medium of claim 15, wherein the user is a driver of one of the electrically powered vehicles, and the steps further comprise:
recommending a route to the driver based on the calculating.

17. The non-transitory computer readable medium of claim 15, wherein the gathering of the information comprises gathering one or more of the following types of information from each of the electrically powered vehicles: a start timestamp, a GPS location, a state of a battery charge, and a battery threshold, and a current driving speed.

18. The non-transitory computer readable medium of claim 15, wherein the displaying comprises displaying virtual representations of the plurality of charging stations via an interface of a mobile electronic device, and wherein the communicating comprises displaying the likelihood as a percentage number next to the virtual representations of the one or more charging stations.

19. The non-transitory computer readable medium of claim 15, wherein the communicating comprises updating the likelihood in real time.

20. The non-transitory computer readable medium of claim 15, wherein the assigning of the weighted probability comprises assigning a more weighted probability to one of the charging stations located farther away from the user than one of the charging stations located closer to the user.

* * * * *